United States Patent [19]

Tanaka

[11] Patent Number: 5,276,674
[45] Date of Patent: Jan. 4, 1994

[54] OPTICAL RECORDING MEDIUM HAVING THIN PROTECTIVE LAYER AND TWO-DIMENSIONALLY ALIGNED CODE WORDS AND RECORDING/REPRODUCING APPARATUS EMPLOYING THE SAME

[75] Inventor: Shinichi Tanaka, Kyoto, Japan

[73] Assignee: Matsushita Electric Industrial Co., Ltd., Osaka, Japan

[21] Appl. No.: 668,852

[22] Filed: Mar. 15, 1991

[30] Foreign Application Priority Data

Mar. 15, 1990 [JP] Japan ................. 2-64651

[51] Int. Cl.5 .................. G11B 3/70; G11B 7/00
[52] U.S. Cl. .................. 369/275.3; 369/275.5; 369/59
[58] Field of Search ............ 369/275.1–; 250/201.5

[56] References Cited

U.S. PATENT DOCUMENTS

| | | | |
|---|---|---|---|
| 4,310,919 | 1/1982 | Slater | 369/275.2 |
| 4,327,430 | 4/1982 | Wada et al. | 369/276 X |
| 4,334,233 | 6/1982 | Murakami | 369/275.5 X |
| 4,569,038 | 2/1986 | Nagashima et al. | 369/44.26 |
| 4,617,601 | 10/1986 | Tanaka | 369/275.5 X |
| 4,752,554 | 6/1988 | Sato et al. | 369/284 X |
| 4,991,163 | 2/1991 | Tokushuku et al. | 369/275.4 |
| 5,054,017 | 10/1991 | Hiroyoshi et al. | 369/58 X |
| 5,100,711 | 3/1992 | Satake et al. | 369/288 X |
| 5,144,552 | 9/1992 | Abe | 369/275.3 |

*Primary Examiner*—Aristotelis Psitos
*Assistant Examiner*—Thang V. Tran
*Attorney, Agent, or Firm*—Wenderoth, Lind & Ponack

[57] ABSTRACT

An optical recording medium includes a substrate, a recording layer formed on the substrate and a transparent protective layer applied to the recording layer. By reducing the thickness of the transparent protective layer to less than 1 mm, it is possible to make the numerical aperture (NA) of an objective lens larger. This structure can achieve a high recording density. Such a thin transparent protective layer causes signal degradation due to dust adhered to the surface of the recording layer and the generation of frequent errors. However, such frequent errors can be corrected by specifying the interleave length and the number of parity symbols added to a code word that constitutes the product code.

9 Claims, 4 Drawing Sheets

OPTICAL RECORDING MEDIUM HAVING THIN PROTECTIVE LAYER AND TWO-DIMENSIONALLY ALIGNED CODE WORDS AND RECORDING/REPRODUCING APPARATUS EMPLOYING THE SAME

BACKGROUND OF THE INVENTION

1. Field of the Invention

The present invention relates to an optical recording medium and an optical read/write apparatus and, more particularly, to an improvement in the recording density of the optical recording medium.

2. Description of the Prior Art

Optical recording technology has been widely used in the high density recording of digital information. Representative of this technology is the compact disc (trademark of Philips and Sony) used for an optical recording medium. The compact disk is now being used as a read only memory for a computer. The optical compact disk is protected by a transparent protective layer having a thickness of 1.2 mm. Further, the optical compact disc halving densely recorded information uses a powerful error correction code and accordingly is compatible with any other medium.

The International Standard 9171 has specified the optical disk for use in an external memory of a computer. There are two types of the Standards of A format and B format. An optical disk of either type can read and write information through the transparent protective layer of 1.2 mm thickness with an objective lens in a numerical aperture (NA) of 0.55. A process of reading and writing information is executed through the transparent protective layer which acts as a protective layer. A laser beam for reading and writing information is focused through the transparent layer of 1.2 mm thickness. Since the laser beam is well defocused on the surface of the transparent layer, dust adhered to the surface does not result in signal-drop-out which causes an inaccurate reading of a disk so long as the dust is not large. The dust size is surely lower than 0.2 mm under the usual environment. The laser is focused with a objective lens in a numerical aperture of 0.55 through the transparent layer having a refractive index of 1.5 and forms a laser beam in a diameter of about 1 mm at the surface of the optical recording medium. The dust having a size lower than 0.2 mm does not prevent the laser beam from focusing and reading correctly. Further, the optical disk employs an error correction code named as a reed-solomon code (RS code). Either of the A format and B format uses the RS code generated at the Galois Field-GF ($2^8$). One byte is made one symbol which is one unit of the RS code. The A format has 520 bytes (520 symbols) arranged at 104 rows and 5 columns at two dimensions. The 104 symbols in a column direction are added with parities of 16 symbols and form the RS code (120,104). Such a long RS code is named as a Long Distance Code (LDC). An information added with the parity can be read sequentially in a row direction from the first row to the 120th row and recorded sequentially on the recording medium. Each symbol in a column direction of the RS code can be arranged at every interval of five symbols on the recording medium. A process to arrange each symbol of a code word at intervals on the recording medium is named as a interleave. The A format mentioned above has an interleave length of five. On the other hand, the B format has an information of 528 bytes arranged at 44 rows and at 12 columns in two dimensions. The RS code (14,12) can be formed by 12 symbols in a row direction added with 2 symbols of parity. The RS code (48,44) can be set up by 44 symbols in a column direction added with 4 symbols of parity. A product code (PC) having a parity added with a row direction and column direction has a correcting power lower than that of the LDC but can obtain a high correcting power by executing an alternate correction at the row direction and the column direction. The detailed explanation on the data correction operation is disclosed in "A VLSI Design of a Pipeline Reed-Solomon Decoder" IEEE Transactions on Computers, vol. c-34, No. 5 by H. M. Shao and others.

In connection with an optical disk, a laser having a wave length of L forms a spot diameter of L/NA. The spot diameter limits the recording density. A objective lens having a higher numerical aperture results in a higher recording density. However, an objective lens having a higher numerical aperture can not always make a laser beam substantially smaller because the laser beam focused through a transparent layer 1.2 mm thickness easily generates aberration for the inclined recording disk. A transparent layer in a lower thickness can make smaller the aberration due to the inclined disk. The transparent protective layer in a thickness lower than 1 mm results in an appreciable degradation of a signal due to the dust adhered to the surface of the transparent protective layer. There are so many errors that the conventional error correction code can not correct the errors. Especially, the B format having only 4 symbols of parity added may erroneously correct a code word including errors which can not essentially be corrected with another code word when the transparent protective layer having a lower thickness generates frequent errors.

The erroneous correction is a problem which can not be neglected for high density recording.

SUMMARY OF THE INVENTION

An object of the present invention is to provide an optical recording medium capable of enlarging a numerical aperture of an objective lens.

A further object of the present invention is to provide an optical recording medium capable of having the optical recording medium inclined at a usual degree with a smaller thickness of the transparent protective layer and a larger numerical aperture of the objective lens and of reading correctly an information generated even when a signal is degraded in quality by dust adhered to the surface of the transparent protective layer having a smaller thickness.

In order to achieve the objects mentioned above, an optical recording medium according to the present invention employs a product code as an error correction code. A code word in one direction has each of symbols arranged at an interleave length sufficient to separate the symbols from each other to prevent a burst error due to the dust adhered to the surface of the optical recording medium. A code word in another direction has parity symbols the number of which is sufficient to decrease the probability of an incorrect correction. Such a structure can make the thickness of the transparent protective layer lower than 1 mm. It is possible to make larger a numerical aperture of an objective lens by a factor of more than $1.2^{\frac{1}{3}}$ ($=1.06$) while keeping an optical recording medium inclined at the same degree as in the conventional manner. This results from a fact that an aberration generated with an inclination of an optical recording medium is in proportion to the numerical aperture of an objective lens and a thickness of transparent protective layer.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF PREFERRED EMBODIMENT

Figure 1:
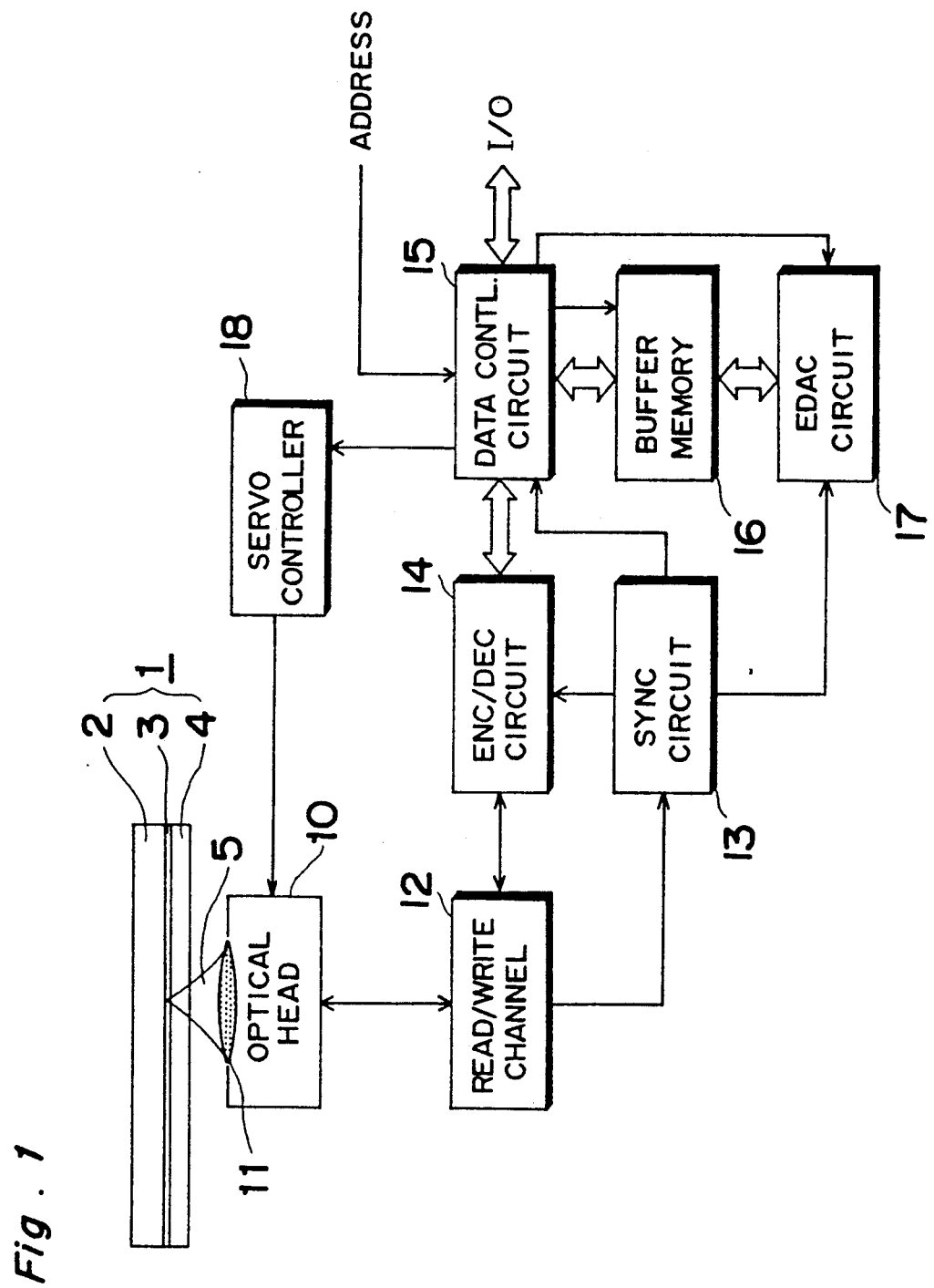
FIG. 1 shows a block diagram of a reproducing apparatus according to the present invention.

Referring to FIG. 1, a block diagram of an optical recording medium and an apparatus of reproducing an information according to the present invention are shown. A recording medium 1 comprises a substrate 2, a recording layer 3 formed on the substrate 2, and a transparent protective layer 4 formed on the recording layer 3. A light beam 5 transmitted from an optical head 10 is focused through an objective lens 11 on the surface of the recording layer 3 so as to read and write information. The thickness of the protective layer 4 is made less than 1 mm so as to make the numerical aperture of the objective lens 11 larger than that of the conventional objective lens.

The objective lens usually consists of a single aspherical lens and is difficult to design a lens having a numerical aperture more than 0.75. Moreover, it is difficult to manufacture a lens having a numerical aperture more than 0.65. The protective layer 4 having a thickness which is sufficiently large to permit the use of an objective lens with a numerical aperture of 0.65 can increase easily the recording density. Such a thickness of the protective layer 4 is:

$$1.2 \times (0.55/0.65)^3 = 0.7 \text{ (mm)}$$

Thus, the thickness of the protective layer 4 is preferably lower than 0.7 mm. When the thickness of the protective layer 4 is made less than 0.5 mm, it is possible to make the numerical aperture of the objective lens 11 to be about 0.74, resulting in a higher recording density.

When the size of the light spot focused on the recording layer 3 is reduced, it is possible to decrease the bit pitch which is essentially equivalent to one bit length of the digital information. However, the decrease of the bit pitch can be realized by a change of modulation code or an equalization, without changing the size of the light spot. Thus, the size of the light spot can not simply determine the limiting size of the bit pitch.

On the other hand, the limit of the track pitch is simply proportional to the light spot. Therefore, when the thickness of the protective layer 4 is made less than 1 mm, it is possible to make the track pitch lower than the conventional track pitch by 1/1.06.

According to the conventional B-Format by International Standard 9171, a minimum of the track pitch including errors is of 1.4 μm. Thus, when the thickness of the protective layer 4 is made less than 1 mm, it is possible to make the track pitch lower than 1.3 μm. The optical recording medium according to the present embodiment employs a protective layer 4 with a thickness of 0.5 mm and a track pitch of 1 μm.

The description is now directed to the error correction code when the protective layer 4 is made so thin as to increase the possibility of producing an error in the reproduced signal. Under the usual environment, the protective layer 4 may receive a dust or a foreign matter of a size of 200 μm at the most. Thus, when a very thin protective layer 4, the thickness is so thin that it can be neglected, is employed, a recording format which can accept the signal defect expanding over 200 μm should be employed. On the other hand, when a thick protective layer 4, the thickness is so thick that the diameter of the light beam impinging thereon is greater than 200 μm, is employed, the signal degrades during the light beam passing through the dust. An improved signal format should be employed so that the data can be recovered even when a signal drop over the length equivalent to a diameter of the light beam takes place.

The diameter D of the light beam at the surface of the protective layer 4 can be given by equation (1);

$$D \approx 2 \cdot NA \cdot t/n_r \text{ (mm)} \tag{1}$$

wherein $n_r$ is a refractive index of the protective layer 4 and t is a thickness expressed in millimeters of the same. Since the conventional arrangement has the protective layer thickness t=1.2 mm for which the numerical aperture (NA) is 0.55, the NA value that can permit the same medium inclination as that of the conventional arrangement with respect to the a thickness t can be given by the following formula;

$$NA \leq 0.55 \cdot (1.2/t)^{\frac{1}{2}} \approx 0.58/t^{\frac{1}{2}} \tag{2}$$

From formulas (1) and (2);

$$D \leq 1.2 \cdot t^{\frac{1}{2}}/n \text{ (mm)} \tag{3}$$

is obtained. An improved recording format should be employed even when a signal defect in a length shown by formula (3) is observed occasionally. To this end, according to the present invention, an error correction code is structured in the following manner.

(1) A product code is employed to enable a powerful recovering ability through repeated correction.

(2) At least one code word has an interleave length sufficiently long to avoid the burst error even when a signal defect with the above described length is observed.

(3) At least one code word in one direction is provided which has a number of parity symbols greater than the number necessary to decrease the percentage of the incorrect correction caused by correcting an error that can not be corrected even with the full correction ability, and an erasure correction is carried out in a direction perpendicular to said one direction.

In the above item (1), the repeated correction is to repeat alternately the correction in the row direction and in column direction. The repeated corrections with the product code can improve the correction ability substantially and are more effective when the erasure correction is used together. The erasure correction is a correction method for correcting the code word in such a manner that, when an error symbol is known previously, the symbol in question is recognized as having been erased, and the erased symbol is calculated from the remaining symbols. When all the non-erased symbols are correct, it is possible to calculate the erased symbols, provided that the number of the erased symbols is the same as that of the parity symbols.

Figure 2:
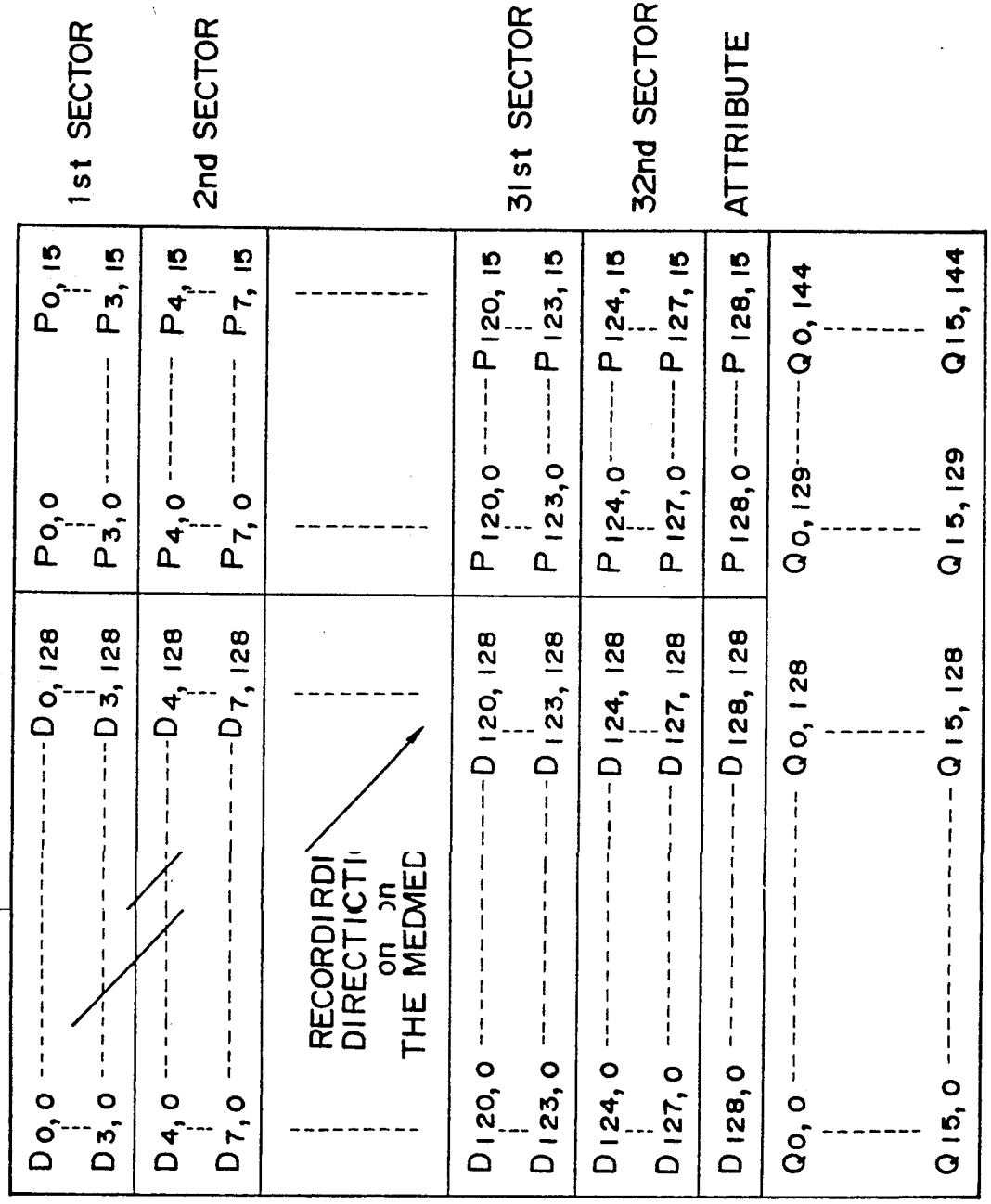
FIG. 2 shows a conceptional diagram of an error correction code of the embodiment.

Referring to FIG. 2, an error correction code in a structure mentioned above according to the present invention is shown. Each symbol consists of 8 bits, and symbols are arranged in a matrix having 129 rows and 129 columns. In the matrix, the i-th row has symbols expressed by $D_{i,0}$—$D_{i,128}$ and is provided with 16 parity symbols $P_{i,0}$—$P_{i,15}$ to form a (145,129) RS code. Similarly, the j-th column is provided with symbols $D_{0,j}$—$D_{128,j}$ and 16 parity symbols $Q_{0,j}$—$Q_{15,j}$ to form a (145,129) RS code. Furthermore, the parity symbols $P_{0,k}$–$P_{128,k}$ are provided with 16 parity symbols $Q_{0,k}$–$Q_{15,k}$ to form a (145,129) RS code. A large block arranged in the above described manner is logically divided into a plurality of sectors. According to the disclosed embodiment, one sector consists of 4 rows (consisting of 516 byte information). An information of each sector consists of, for example, 512 bytes of user information and 4 bytes of CRC for error detection. The remainder information ($D_{128,0}$–$D_{128,128}$) at the 129th row are used for the attribute information for each sector.

On the recording medium, the data is recorded as a recording head scans diagonally on the matrix. That is, for recording the data, the symbols on the recording medium are used in the following order:

$D_{0,0}$, $D_{1,1}$ ... $D_{128,128}$, $Q_{0,129}$ ... $Q_{15,144}$, $D_{1,0}$, $D_{2,1}$ ... $D_{128,127}$, $Q_{0,128}$ ... $Q_{15,143}$, $P_{0,15}$, $D_{2,0}$, $D_{3,1}$ ... $D_{128,126}$, $Q_{0,127}$ $Q_{15,142}$, $P_{0,14}$, $P_{1,15}$, $D_{3,0}$ ...

The description is now directed to a process to reproduce the information recorded using the error correction code. When an external apparatus such as a host computer designates a sector address at which an information to be read is stored, a data control circuit 15 calculates a block address and a sector address in the block. The calculated block address is sent to a servo controller 18 to position the optical head 10. The optical head irradiates a light beam at a level not to erase the recorded information on the recording medium 1 and receives the reflected light to generate a read signal. A read/write channel 12 receives the read signal, amplifies it, and outputs a digital signal after the wave shaping. A timing circuit 13 extracts a clock signal and a synchronizing signal from the digital signal. An ENC/DEC (encoder/decoder) circuit 14 reads the digital signal as a channel code and demodulates the channel code to a data word with reference to the clock signal and the synchronizing signal sent from the timing circuit 13. A data control circuit 15 extracts, in synchronizing with the synchronizing signal from timing circuit 13, a block address information from the data word as produced from the ENC/DEC 14, and determines whether or not the block address represents the block that includes the sector address designated by the external apparatus. When the data control circuit 15 detects the block address representing the block including the designated sector address, the symbols each consisting of 8 bits are read out in synchronized relation with the synchronizing signal from the timing circuit 13, and are stored in buffer memory 16. The buffer memory 16 stores the symbols which are read diagonally in the matrix, in the same order as that of the recording process, as follows:

$D_{0,0}$, $D_{1,1}$ ... $D_{128,128}$, $Q_{0,129}$ ... $Q_{15,144}$, $D_{1,0}$, $D_{2,1}$ ... $D_{128,127}$, $Q_{0,128}$ ... $Q_{15,143}$, $P_{0,15}$, $D_{2,0}$, $D_{3,1}$ ... $D_{128,126}$, $Q_{0,127}$ $Q_{15,142}$, $P_{0,14}$, $P_{1,15}$, $D_{3,0}$ ...

After reading all of the symbols at the block, the data controls circuit 15 control the EDAC (error detection and correction) circuit 17 to correct the error in a row direction. Since each code word has 16 parity symbols, it is possible to correct 8 symbols. A flag is set at each row which can not be corrected. After execution of correction in the row direction, the correction process is finished when there is no set flag. When there is a row with a flag set, the data controls circuit 15 control the EDAC circuit 17 to execute the correction in the column direction. When the number of the flag(s) set during the correction process in the row direction does not exceed 16, it is possible to correct all the errors with the erasure correction in the column direction under recognizing that all the symbols in the row(s) having flag(s) set thereon have been deemed as erased, provided that the remaining symbols are correct. When there are rows having set flags more than 16, the correction process in the column direction is carried out in the same manner as that carried in the row direction. Furthermore, the flags should be set on the column(s) which can not be corrected. In such a way, the correction process is executed alternately in the row direction and in the column direction until all the flags are cleared or until the flags decrease no more.

When all the error(s) in the given sector are corrected, the data control circuit 15 reads data of the sector from the buffer memory 16 and sends it to the external apparatus. When the given sector still has one or more errors left, a signal representing the read error is sent to the external apparatus.

The following description will explain a process for rewriting data at a given sector. When an address of a sector which requires revising is designated by the external apparatus, the data control circuit 15 reads the block information including the designated sector in the same manner as that of the reading process mentioned above and stores the block information in the buffer memory 16. The correction process is carried out with the correction process in the same manner as that of reading process. When all the errors can not be corrected, the data control circuit 15 sends a signal indicating the read error to the external apparatus. On the other hand, when all the errors are corrected, the data control circuit 15 requires the external apparatus to send the data to be re-written. When the data is sent from the external apparatus, the data control circuit 15 replaces the data at the given sector with the data from the external apparatus. And then, the data controls circuit 15 control the EDAC circuit 17 to form the parity based on the re-written data. Thus formed data for the block is read from the buffer memory 16 in the order mentioned above and are recorded on the recording medium.

Figure 3:
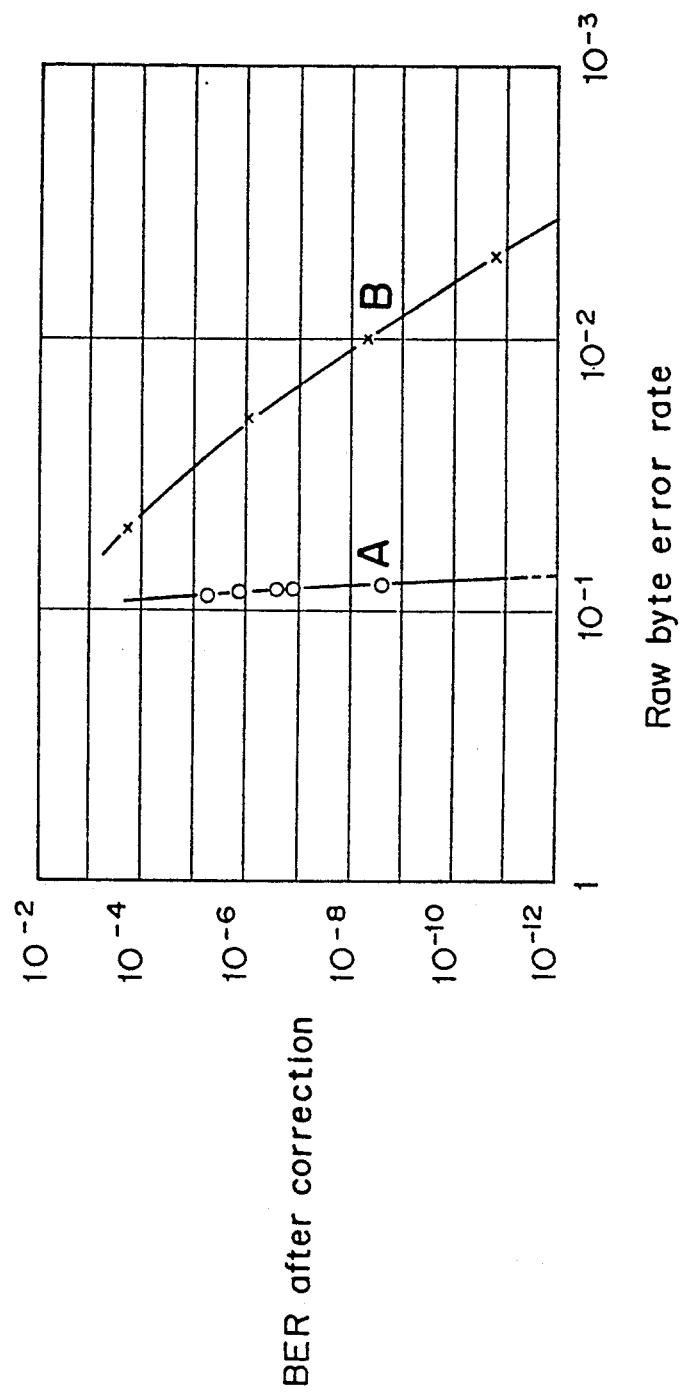
FIG. 3 shows a graph showing a correction power of the error correction code shown in FIG. 2.

Referring to FIG. 3, a correction power with respect to the random error during a process of an error correction is shown. A curve A shows a correction power of the error correction code used in the above described embodiment and a curve B shows a correction power according to the prior art using the A-format of International Standard 9171. As apparent from FIG. 3, the correction power according to the present embodiment can achieve a high reliability to correct the errors even when the protective layer 4 becomes thin and the error rate increases by one order of magnitude.

According to the embodiment described above, the erasure correction is employed to obtain the high correction power. To ensure the erasure correction, it is necessary to detect the code word without failure so as to set the flags without any mis-detection. Otherwise there is a possibility to recognize the block data including errors which remain uncorrected correctly as a right data. In the present embodiment, since the code word is provided with 16 symbols parity, there is a possibility that, if there are errors in 9 symbols, 8 other symbols may be corrected incorrectly. However, such a probability is $255^{-8}$ and can be neglected.

The following is a method to obtain the necessary number of parity symbols for the purpose of lowering the probability of incorrect correction. Assume that each symbol consists of n bits. That is, a code word is developed on the Galois field GF ($2^n$). When the number of parity symbols is d, the correctable symbols is expressed as follows:

$$[d/2] \text{ symbols}$$

in which [ ] indicates the Gauss function. When the number of the incorrect symbols increases to $[(d+3)/2]$, there is a probability of incorrect correction. In this case, the probability is:

$$(2^n-1)^{[(d+1)/2]}$$

It is generally said for a data memory to be necessary of making bit error rate less than $10^{-12}$. Thus, when the symbols included in the code word is assumed to be m, it is possible to reduce the probability of incorrect correction by determining the d value to satisfy the following formula:

$$(2^n-1)^{[(d+1)/2]} \geq 10^{12}/(n \cdot m)$$

When the number n of bits in one symbol is 8 and the number m of symbols in the data is 30, the value d should be more than 7.

According to the present embodiment, the interleave length is set to 145. Thus, when one bit length on the recording medium is assumed to be 1 μm, the symbols comprising a code word are separated from each other by a distance more than at least 1 mm. A comparatively large dust adhered to the surface of the recording medium can not consequently cause the burst error in one code word. Therefore all errors can be considered as a random error and the correction power shown in FIG. 3 will not be degraded by the burst errors.

When the thickness of the transparent protective layer 4 decreases, the error due to the dust increases. Thus, in order to reduce the generation of the burst errors below a predetermined limit value, it is necessary to elongate the interleave length sufficiently long. With respect to the signal defect generated frequently, it is ideally desirable to generate only one error within one code word, if such an error should occur. However, when the number of incorrect symbols caused by one defect are less than half the number of the symbols which can be corrected, there would be still some more correction power to correct other signal defects in the block, providing a sufficient and effective interleave. When d represents the number of the parity symbols contained in the code word, the number of the incorrect symbols which can be corrected is $[d/2]$. Thus, a distance between the symbols contained in the code word should be longer than 1 $[d/2]$ times the length of the defect in the read signal. A dust with a length 200 μm frequently adheres to the protective layer 4 and causes frequently the signal defect in such a degree. Furthermore, a signal defect of a size similar to the diameter of the light beam measured on the surface of the protective layer 4 may occur sometimes. Such a diameter can be expressed as $1.2 \cdot t^{\frac{1}{2}}/n$ (MM), as given by formula (3). Therefore, the interleave length should be equal to or greater than both of the following formulas:

$$200/[d/2] \text{ (μm)}$$

and $$1.2 \cdot t^{\frac{1}{2}}/(n \cdot [d/2]) = 4 \cdot t \cdot NA/(n \cdot [d/2]) \text{(mm)}$$

The error correction code as described above has a reliability in practical use even when protective layer 4 is made thinner than 1 mm. Thus, it is possible to improve the recording density.

Figure 4:
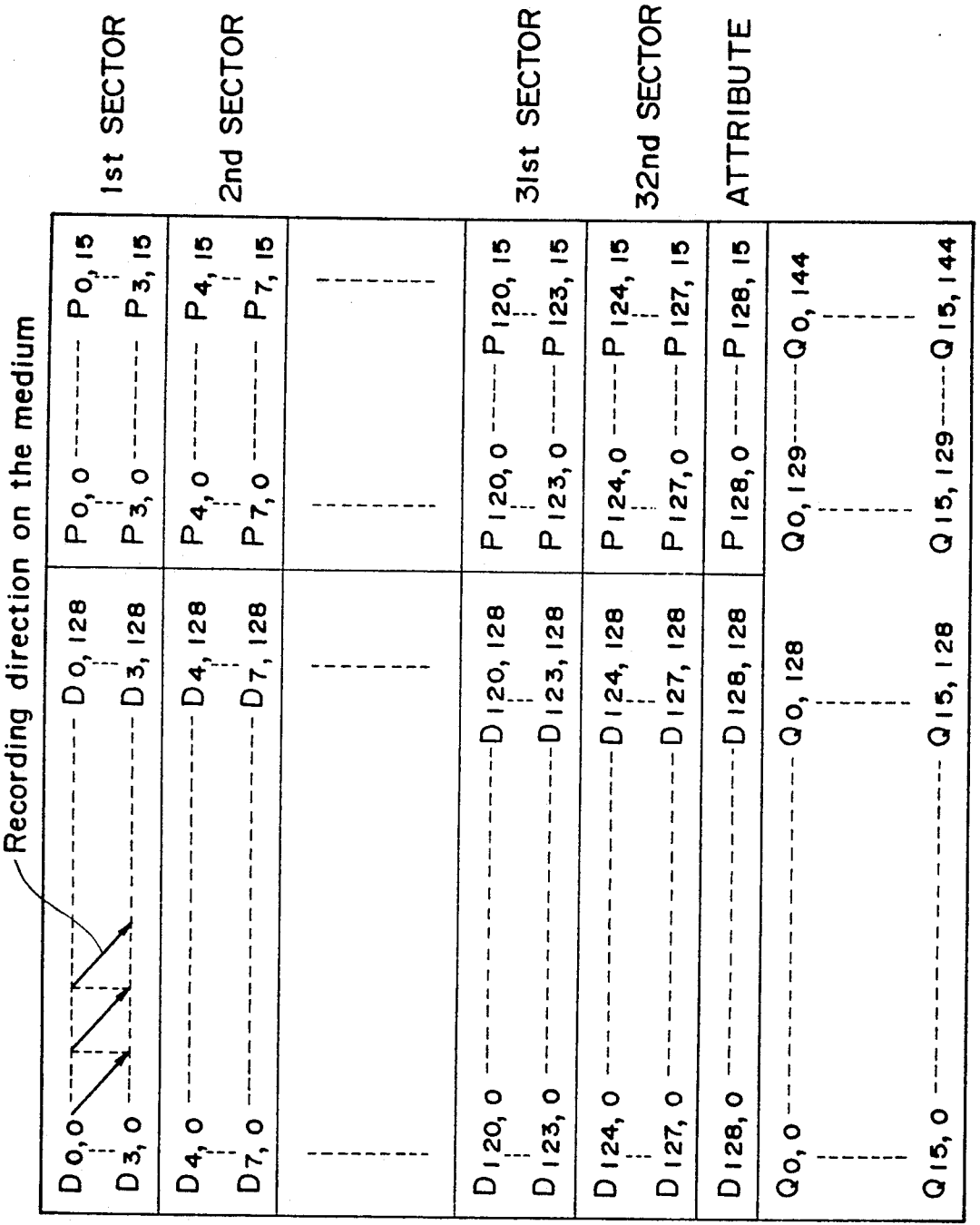
FIG. 4 shows an illustration of a conceptional diagram of an error correction code of another embodiment.

Referring to FIG. 4, another embodiment of the error correction code of the present invention is shown. The embodiment shown in FIG. 4 differs from that shown in FIG. 2 in the order of reading and writing the block data on the recording medium. As shown in FIG. 4, the data is read diagonally, but not from top to the bottom of the block. The data is read out diagonally within a sector containing four lines in the order indicated below.

$D_{0,0} \ldots D_{3,3}, D_{0,4} \ldots D_{3,7} D_{0,8} \ldots D_{3,11} \ldots P_{0,11} \ldots P_{3,14}, D_{0,1} \ldots D_{3,4}, D_{0,5} \ldots D_{3,8}, D_{0,9} \ldots D_{3,12} \ldots P_{0,13} \ldots P_{3,15}$ By the data alignment in the above described manner, it is possible to record the data of each sector on the continuous region without being interfered by other sector data. The data alignment in the sector on the continuous region is similar to the error correction code alignment by the prior art LDC. Thus, the correction power according to the present invention has the same power as obtained by the conventional structure.

If the correction power is sufficient, it is not necessary to record the parity symbols $Q_{0,0} \ldots Q_{15,15}$.

Furthermore, when the RS code in the column direction is generated with the inclusion of parity symbols $Q_{0,0} \ldots Q_{15,15}$, the code word has the interleave length of 145. In this case, the correction power is nearly similar to that shown in FIG. 2. With such a structure, it is possible to switch between the prior art correction format system and the correction format system of the present invention, depending on the necessary correction power.

Figure 5:
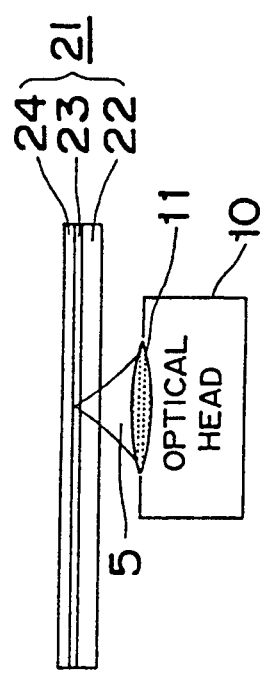
FIG. 5 shows a cross section of an optical recording medium of another embodiment.

Referring to FIG. 5, a modification of the recording medium is shown. A transparent substrate 22 having a thickness less than 1 mm is used as a transparent protective layer. It is necessary to apply a back coating 24 to the surface of the recording medium for protecting the recording layer 23.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A recording medium for carrying optically readable digital information including an error correction code, comprising:

a recording layer including information tracks having said digital information recorded thereon, said tracks aligned at a pitch of less than 1.3 microns; and, a protective layer having a thickness of less than 1 millimeter through which said digital information is optically readable, said protective layer covering said recording layer so as to protect said recording layer;

said recording layer having recorded thereon a product code of code words aligned two-dimensionally on said recording medium in rows and columns, wherein each recorded code word includes information symbols and parity symbols added to each row and each column for error correction in the row and column directions, wherein said symbols in a code word in at least one of the row and column directions are spaced apart on said recording medium by at least a distance A and by at least a distance B, wherein $A = (1.2 \cdot t^3)/(n_r \cdot (d/2))$ (millimeters), and $B = 200/(d/2)$ (microns), wherein $(d/2)$ denotes a Gauss function in which d denotes a number of parity symbols in said at least one of said row and column directions, $n_r$ denotes a refractive index of said protective layer, and t denotes a thickness of said protective layer, and wherein said code word in said at least one of said row and column directions is generated on a Galois Field $(2^n)$ having m information symbols and d parity symbols contained therein such that $(2^n - 1)^{((d+1)/2)} \geq 10^{12}/(n \cdot m)$.

2. A recording medium as claimed in claim 1, wherein said symbols in a code word in both said column and row directions are space apart on said recording medium by at least said distance A and by at least said distance B.

3. A recording medium as claimed in claim 1, wherein said code word in both said row and column directions is generated on a Galois Field $(2^n)$ having m information symbols and d parity symbols contained therein such that $(2^n - 1)^{((d+1)/2)} \geq 10^{12}/(n \cdot m)$.

4. An apparatus for recording and/or reproducing digital information including an error correction code, comprising:

a recording medium for optically carrying said digital information; and, a recording/reproducing means for directing light beams onto said recording medium so as to record and/or reproduce said digital information on said recording medium, said recording/reproducing means including a lens having a numerical aperature NA which is greater than 0.58;

wherein said recording medium includes (a) a recording layer having information tracks having said digital information recorded thereon, said tracks aligned at a pitch of less than 1.3 microns; and, (b) a protective layer having a thickness of less than 1 millimeter through which said digital information is optically read, said protective layer covering said recording layer so as to protect said recording layer;

said recording layer having recorded thereon a product code of code words aligned two-dimensionally on said recording medium in rows and columns, wherein each recorded code word includes information symbols and parity symbols added to each row and each column for error correction in row and column directions, wherein said symbols in a code word in at least one of the row and column directions are spaced apart on said recording medium by at least a distance A and by at least a distance B, wherein $A = (2 \cdot t \cdot NA)/(n_r \cdot (d/2))$ (millimeters), and $B = 200/(d/2)$ (microns), wherein $(d/2)$ denotes a Gauss function in which d denotes a number of parity symbols in said at least one of said row and column directions, $n_r$ denotes a refractive index of said protective layer, and t denotes a thickness of said protective layer, and wherein said code word in said at least one of said row and column directions is generated on a Galois Field $(2^n)$ having m information symbols and d parity symbols contained therein such that $(2^n - 1)^{(d+1)/2} \geq 10^{12}/(n \cdot m)$.

5. A recording medium as claimed in claim 4, wherein said symbols in a code word in both said column and row directions are space apart on said recording medium by at least said distance A and by at least said distance B.

6. A recording medium as claimed in claim 4, wherein said code word in both said row and column directions is generated on a Galois Field $(2^n)$ having m information symbols and d parity symbols contained therein such that $(2^n - 1)^{(d+1)/2} \geq 10^{12}/(n \cdot m)$.

7. An apparatus as claimed in claim 4, wherein said code words are divided into blocks and are stored in blocks with assigned addresses, each block being divided into a plurality of sectors, so as to enable the reading and revising of the stored data by a sector.

8. An apparatus as claimed in claim 7, wherein said code words are sequentially stored in the recording medium in the order of diagonal scanning over said two-dimensional alignment.

9. An apparatus as claimed in claim 8, further comprising a buffer memory means, operatively coupled to said recording/reproducing means, for temporarily storing all the code words contained in a sector for carrying out an error correction operation in said sector such that the parity symbols added to each code words in the row direction are checked to generate a code word, and before the code word is restored back to the recording medium, the parity symbols added to each code word in the column direction are checked to generate a code word.

* * * * *

UNITED STATES PATENT AND TRADEMARK OFFICE
CERTIFICATE OF CORRECTION

PATENT NO. : 5,276,674
DATED : January 4, 1994
INVENTOR(S) : Shinichi TANAKA

It is certified that error appears in the above-indentified patent and that said Letters Patent is hereby corrected as shown below:

In the drawings, Sheet 2, Fig. 2, should appear as follows:

*Fig. 2*

| | | |
|---|---|---|
| $D_{0,0}$ -------- $D_{0,128}$ <br> $D_{3,0}$ -------- $D_{3,128}$ | $P_{0,0}$ ........ $P_{0,15}$ <br> $P_{3,0}$ -------- $P_{3,15}$ | 1st SECTOR |
| $D_{4,0}$ -------- $D_{4,128}$ <br> $D_{7,0}$ -------- $D_{7,128}$ | $P_{4,0}$ -------- $P_{4,15}$ <br> $P_{7,0}$ -------- $P_{7,15}$ | 2nd SECTOR |
| RECORDING DIRECTION on THE MEDIUM | | |
| $D_{120,0}$ -------- $D_{120,128}$ <br> $D_{123,0}$ -------- $D_{123,128}$ | $P_{120,0}$ ----- $P_{120,15}$ <br> $P_{123,0}$ ----- $P_{123,15}$ | 31st SECTOR |
| $D_{124,0}$ -------- $D_{124,128}$ <br> $D_{127,0}$ -------- $D_{127,128}$ | $P_{124,0}$ ----- $P_{124,15}$ <br> $P_{127,0}$ ----- $P_{127,15}$ | 32nd SECTOR |
| $D_{128,0}$ -------- $D_{128,128}$ | $P_{128,0}$ ----- $P_{128,15}$ | ATTRIBUTE |
| $Q_{0,0}$ -------- $Q_{0,128}$ <br> $Q_{15,0}$ -------- $Q_{15,128}$ | $Q_{0,129}$ ----- $Q_{0,144}$ <br> $Q_{15,129}$     $Q_{15,144}$ | |

UNITED STATES PATENT AND TRADEMARK OFFICE
CERTIFICATE OF CORRECTION

PATENT NO. : 5,276,674
DATED : January 4, 1994
INVENTOR(S) : Shinichi TANAKA

It is certified that error appears in the above-indentified patent and that said Letters Patent is hereby corrected as shown below:

Column 10, Claim 5, line 1, change "A recording medium" to

--An apparatus--.

Column 10, Claim 6, line 1, change "A recording medium" to

--An apparatus--.

Signed and Sealed this

Sixteenth Day of December, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,276,674  
APPLICATION NO. : 07/668852  
DATED : January 4, 1994  
INVENTOR(S) : Shinichi Tanaka Page 1 of 1

It is certified that error appears in the above-identified patent and that said Letters Patent is hereby corrected as shown below:

Col 9, line 27, change "$A=(1.2 \cdot t^{2/3})/(n_r \cdot (d/2))$ (millimeters)" to --$A=(1.2 \cdot t^{2/3})/(n_r \cdot [d/2])$ (millimeters)--.

Col 9, line 29, change "$B=200/(d/2)$ (microns)" to --$B=200/[d/2]$ (microns)--.

Col 9, line 31, change "wherein $(d/2)$" to --wherein $[d/2]$--.

Col 9, line 41, change "$(2^n-1)^{((d+1)/2)} \geq 10^{12}/(n \cdot m)$" to --$(2^n-1)^{[(d+1)/2]} \geq 10^{12}/(n \cdot m)$--.

Col 10, line 20, change "$(2^n-1)^{((d+1)/2)} \geq 10^{12}/(n \cdot m)$" to --$(2^n-1)^{[(d+1)/2]} \geq 10^{12}/(n \cdot m)$--.

Col 10, line 20, change "$A=(2 \cdot t \cdot NA)/n_r \cdot (d/2))$ (millimeters)" to --$A=(2 \cdot t \cdot NA)/n_r \cdot [d/2])$ (millimeters)--.

In the Claims

Col 10, line 22, change "$B=200/(d/2)$ (microns)" to --$B=200/[d/2]$ (microns)--.

Col 10, line 24, change "wherein $(d/2)$" to --wherein $[d/2]$--.

Col 10, line 35, change "$(2^n-1)^{(d+1)/2)} \geq 10^{12}/(n \cdot m)$" to --$(2^n-1)^{[(d+1)/2]} \geq 10^{12}/(n \cdot m)$--.

Col 10, line 47, change "$(2^n-1)^{(d+1)/2)} \geq 10^{12}/(n \cdot m)$" to --$(2^n-1)^{[(d+1)/2]} \geq 10^{12}/(n \cdot m)$--.

Signed and Sealed this

Twelfth Day of June, 2007

JON W. DUDAS  
*Director of the United States Patent and Trademark Office*